D. A. CALLAWAY.
DEVICE FOR PRESERVING EGGS.
APPLICATION FILED SEPT. 26, 1907.

956,568.

Patented May 3, 1910.

2 SHEETS—SHEET 1.

Witnesses.

Inventor.

David Abram Callaway

D. A. CALLAWAY.
DEVICE FOR PRESERVING EGGS.
APPLICATION FILED SEPT. 26, 1907.
956,568.
Patented May 3, 1910.
2 SHEETS—SHEET 2.
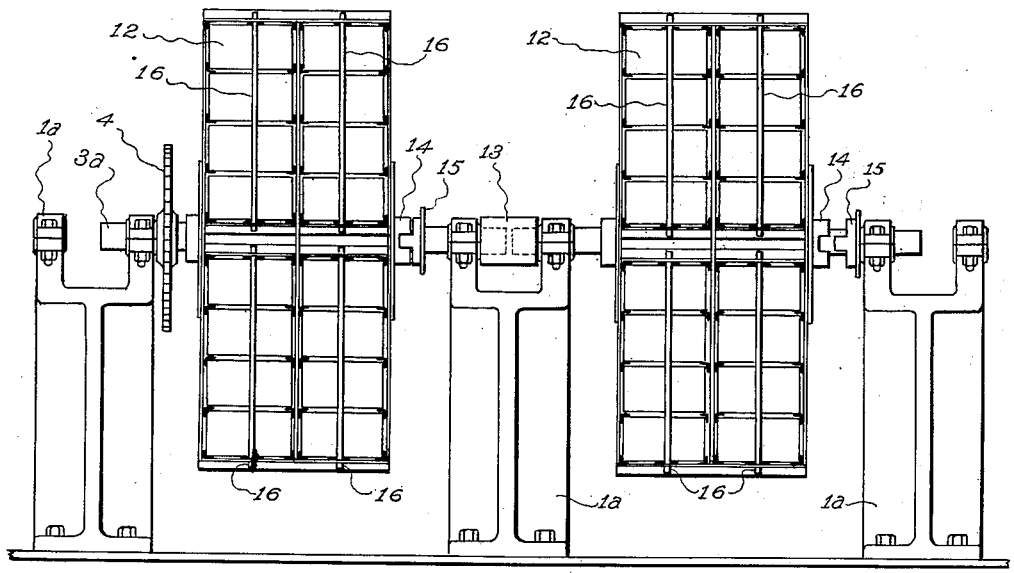
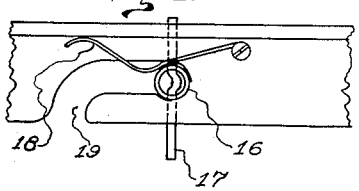
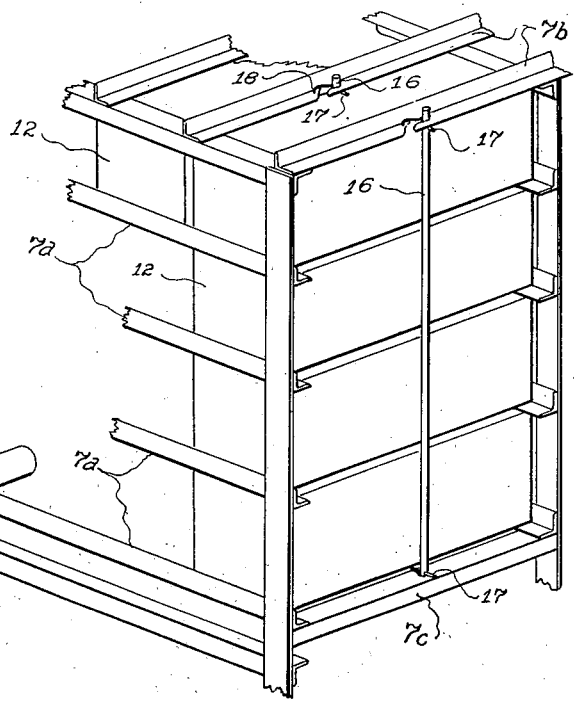
Witnesses.
Geo. L. Walker
Roy R. Miller
Inventor.
David Abram Callaway

UNITED STATES PATENT OFFICE.

DAVID ABRAM CALLAWAY, OF PUEBLO, COLORADO, ASSIGNOR OF ONE-FOURTH TO H. G. DE TIENNE AND ONE-FOURTH TO LYMAN I. HENRY, OF PUEBLO, COLORADO.

DEVICE FOR PRESERVING EGGS.

956,568.

Specification of Letters Patent.

Patented May 3, 1910.

Application filed September 26, 1907. Serial No. 394,732.

*To all whom it may concern:*

Be it known that I, DAVID ABRAM CALLAWAY, a citizen of the United States, residing at Pueblo, in the county of Pueblo and State of Colorado, have invented a new and useful Device for Preserving Eggs.

My invention relates to improvements in egg preserving devices in which a frame work having an axle passing through it, or attached to its sides, serves as a rack in which boxes containing eggs are placed and the frame thus loaded is rotated slowly, moving the eggs in a circle, and thereby preventing the yolks of the eggs from settling or passing through the albumen to the shells; and the objects of my invention are first, to provide a cheap and practical means for storing large quantities of eggs in rotatable frames that may be operatively connected to each other and be operated from one source of power; and second, to provide a means for keeping eggs in a rotating motion while being shipped; and third, to provide a means for constantly changing the position of eggs that are packed in cases so that the yolks will be held in suspension near the middle of the eggs, for the purpose of preserving the eggs by keeping the yolks from coming in contact with the membrane and shells, which being porous admit air into the yolks and cause decay. I attain these objects by the mechanisms illustrated in the accompanying drawings in which—

Figure 1:
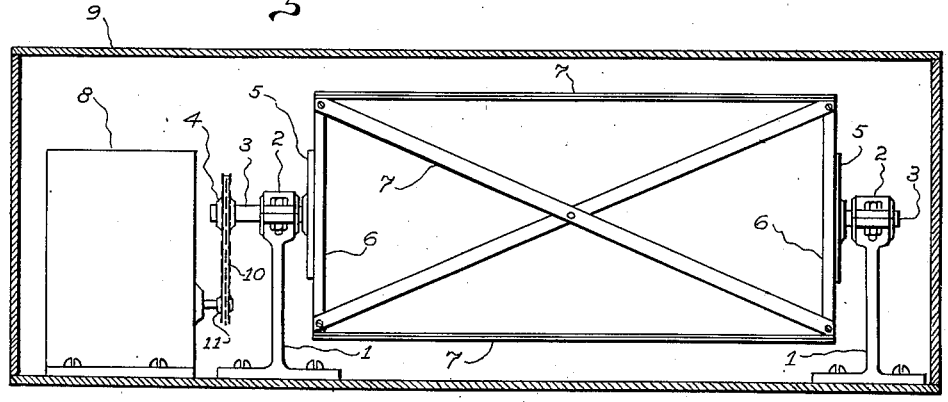
Figure 2:
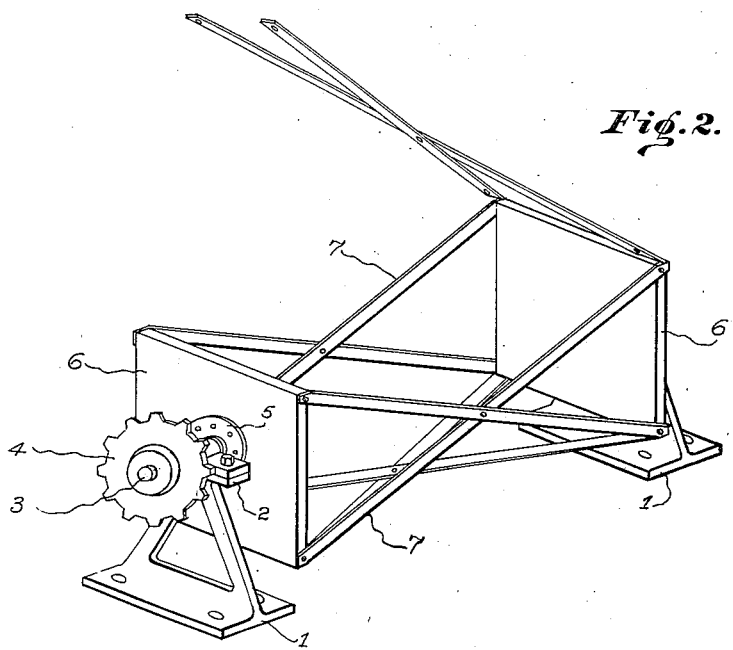

Figure 1 is a front elevation of my invention mounted in a box that is shown in vertical cross section, and showing manner of connection by sprocket chain to a motor or clock which furnishes the power to rotate the rack. Fig. 2 is a perspective view of my invention designed to hold a single package or case of eggs, such as would be used in shipping high grade eggs for hatching purposes. Fig. 3 is a perspective, in broken section, of one corner of the rack used to contain a large number of cases of eggs. Fig. 4 is an enlarged plan view of a portion of one of the angles of the rack showing a means of attaching retaining rods or pipes to hold the cases of eggs from falling out of the rack. Fig. 5 is a front elevation of two of the large racks mounted together to be rotated by one sprocket wheel connection to the rotating power.

Similar numbers refer to similar parts throughout the several views.

On bearing stands 1 is mounted the crate, or rack, composed of ends 6 and slats 7 by means of shafts 3 on disks 5 that are attached to the ends 6 of the crate. The sprocket wheel 4 is keyed to shaft 3 and is connected by a sprocket chain 10 to a sprocket wheel 11, Fig. 1, of a motor or clock of sufficient power to rotate the crate when it contains a package of eggs. The slats 7 on one side of the crate are removed to insert or remove the package of eggs. The bearing stands 1 may be secured to the floor of a box 9 to which the clock or motor 8 is also secured by screws, in proper position for attachment by chain 10 to sprockets 4 and 11, all in such manner as to be finally inclosed in box 9, which serves as a shipping case for the crate, motor or clock, and eggs contained therein; the clock or motor being wound and started operatively to rotate the egg containing crate while in transit, thus keeping the eggs moving in a circle in such manner that the yolks will not settle to the shells of the eggs, keeping the yolks away from the air that enters the pores of the shells.

The crate shown in Figs. 1 and 2, just described, is readily usable for keeping eggs in circular motion when not in transit and is adapted for use in hotels, on board ships, and in locations that are isolated from egg markets.

In Figs. 3, 4, and 5 a rack designed to contain a large number of packages of eggs is shown, that is constructed in such manner that several racks may be set in a row and be connected to each other by shaft couplings 13, and be rotated by power that is applied to a single sprocket wheel 4. This rack is composed of angles 7ª 7ᵇ and 7ᶜ that are mounted on other frame work in such manner as to properly fit the form of the egg cases, and of such proportions and form that many rows of egg cases may be placed in the rack, the angles 7ª serving to engage the ends of the cases and on which the cases are slid into the rack where they are held from sliding out by the bar 16, one end of which is inserted in a hole in angle 7ᶜ and the other end is pressed into the slot 19, Fig. 4, of the angle 7ᵇ. The said bar 16 is provided with pins 17 placed so as to be under angle 7ᵇ and over angle 7ᶜ in such manner that the bar will not fall out when the rack is being rotated, the spring 18 serving to hold the end of bar 16 from falling free from the slot 19 of the said angle.

Fig. 3 discloses a one-quarter sub-division of a vertical one-half of one rack shown in Fig. 5, showing, among other things, that the spaces are so arranged that an ordinary or commercial egg-case is placed in the shelf and shoved to the back part of the structure, and that, when every shelf or any desired number of shelves have been so filled, the retaining-bar 16 is placed by fastening the respective ends in angles 7$^b$ and 7$^c$ at the outside of each quarter sub-division of the whole structure. These retaining-bars are placed at such distance apart as to correspond to the width of an ordinary egg-case.

The double bearings 1$^a$ carry the shafts 3$^a$ which pass through the racks, and the racks are turnable on said shafts, and the female portion of a clutch being rigidly attached to the racks are engaged to the male portions 15 of the clutch which is keyed to the shaft and causes the racks to rotate with shafts 3$^a$. When it is desired to move the egg cases 12 from one of the racks the male portion of the clutch is pulled from engagement with the female portion whereupon the rack will cease rotating, while the other racks will continue to rotate with the shafts.

By the arrangement shown in Fig. 5, which shows one rack in gear and the other out of gear, it may be seen that any number of racks may be joined as these two are joined and all be rotated by a single sprocket 4, or a sprocket 4 may be applied on each rack's shaft 3$^a$ and be connected to sprockets on a line shaft, from which power is taken, to distribute the power along between the several racks. Every shelf of a rack is of the length of two ordinary egg-cases, their longest dimensions being parallel with the line of shaft and shown in the drawings to be four deep. The structure is in the form of a square about the shaft and the entire rack being subdivided into quarters for convenience in loading and unloading.

Having thus fully and accurately described my invention so that one versed in the art could make and use the same, and not confining myself to the precise form of the racks, the manner of placing them in and out of gear, or the sprocket wheel means of applying power to rotate them, what I claim as new and desire to secure by Letters Patent is—

1. In a device for preserving eggs, an egg-package containing-rack having seats thereon, and a bar arranged to be moved laterally for engagement with and disengagement from said seats, said bar being adapted to retain egg-packages in the rack.

2. In a device for preserving eggs, an egg-package containing-rack having transverse members, there being an aperture in one and a slot in another of said members, a spring adjacent to said slot, and a bar arranged for removable engagement with said aperture and slot and to be retained therein by said spring, whereby the egg-packages are retained in said rack.

3. A device for preserving eggs, comprising a shaft, means for rotating said shaft, an egg-package containing-rack loosely mounted on said shaft, and means whereby the rotation of said shaft is imparted to said case.

4. A device for preserving eggs, comprising a shaft, means for rotating said shaft, an egg-package containing-rack loosely mounted on said shaft, and a clutch coöperating to rotate said case.

DAVID ABRAM CALLAWAY.

Witnesses:
H. G. De Tienne,
Lyman I. Henry.